(12) United States Patent  
Domínguez Aparicio et al.

(10) Patent No.: US 7,775,550 B2  
(45) Date of Patent: Aug. 17, 2010

(54) AIRBAG COVER WITH AN EMBLEM

(75) Inventors: Francisco Domínguez Aparicio, Vigo (ES); Andreas Maria Joachim Jonietz, Vigo (ES)

(73) Assignee: Dalphi Metal Espana S.A., Madrid (ES)

( * ) Notice: Subject to any disclaimer, the term of this patent is extended or adjusted under 35 U.S.C. 154(b) by 0 days.

(21) Appl. No.: 12/082,075

(22) Filed: Apr. 8, 2008

(65) Prior Publication Data

US 2008/0252050 A1    Oct. 16, 2008

(30) Foreign Application Priority Data

Apr. 10, 2007    (EP) .................................. 07381031

(51) Int. Cl.  
*B60R 21/20* (2006.01)

(52) U.S. Cl. .................................. 280/728.3; 280/731

(58) Field of Classification Search .............. 280/728.2, 280/728.3, 731  
See application file for complete search history.

(56) References Cited

U.S. PATENT DOCUMENTS

| | | | | |
|---|---|---|---|---|
| 5,775,721 A | * | 7/1998 | Grout | 280/727 |
| 5,851,022 A | * | 12/1998 | Yamamoto et al. | 280/728.3 |
| 6,099,027 A | * | 8/2000 | Shirk et al. | 280/728.3 |
| 6,158,764 A | * | 12/2000 | Preisler et al. | 280/728.2 |
| 6,168,187 B1 | * | 1/2001 | Yamada et al. | 280/728.3 |
| 6,247,724 B1 | * | 6/2001 | Jambor et al. | 280/731 |
| 6,568,701 B1 | * | 5/2003 | Burdack et al. | 280/728.2 |
| 6,613,415 B2 | * | 9/2003 | Iida et al. | 428/139 |
| 6,695,344 B2 | * | 2/2004 | Hauer | 280/731 |
| 6,846,007 B2 | * | 1/2005 | Iida et al. | 280/728.3 |
| 6,942,246 B2 | * | 9/2005 | Hohne et al. | 280/731 |
| 7,000,941 B2 | * | 2/2006 | Yokota et al. | 280/728.2 |
| 7,172,210 B2 | * | 2/2007 | Yokota et al. | 280/728.2 |

\* cited by examiner

*Primary Examiner*—Toan C To  
(74) *Attorney, Agent, or Firm*—Ladas and Parry LLP

(57) ABSTRACT

The present invention relates to an airbag cover (11) for automotive vehicles comprising means to predetermine its breaking during deployment of the airbag cushion, incorporating an emblem (13) formed by at least two independent parts (21, 23) and which is fixed to the cover (11) by means of the aid of one or more rods arranged on its inner face and comprising at least two areas (31, 35), each of which includes snap-fitting means cooperating with the rods of each of said at least two parts (21, 23) and an intermediate area (33) between them which is configured such that it can work as a bending area of the snap-fitting plate (17) during deployment of the airbag cushion, allowing relative movement between the parts (21,23) of the emblem (13).

16 Claims, 4 Drawing Sheets

AIRBAG COVER WITH AN EMBLEM

FIELD OF THE INVENTION

The present invention relates to an airbag cover for an automotive vehicle with an emblem fixed thereto, such as a logotype of the vehicle manufacturer, and more particularly with an emblem snap-fit to the cover.

BACKGROUND OF THE INVENTION

Different types of airbag covers are currently known which incorporate an emblem generally consisting of the logotype of the vehicle manufacturer, aiding in identifying its brand image.

In one of these types, which include the proposals described in patent applications US 2004/0174002, GB 2 403 693, DE 10148279 and DE 10 2004 046 866, the airbag cover is made of a soft plastic, the emblem is also made of a soft plastic and the perforation line of the cover traverses the emblem.

In another one of these types, the airbag cover is made of a soft plastic, the emblem is made of a hard plastic usually with special coating providing it with a metallic appearance, and the perforation line is arranged surrounding the emblem so as to not traverse it.

The fixing of the emblem to the airbag cover can be done in several manners.

One of them is the fixing by means of welding, for example by means of ultrasonic welding. The problems involved with this type of fixing include those relating to complying with the welding quality requirements and to the suitable maintenance of the equipment used.

Another one of these fixings is fixing the emblem to the cover using snap-fitting means. This type of fixing has the drawback that the snap-fitting plate confers excessive rigidity to the emblem-cover-snap-fitting plate assembly during the opening of the cover at the time of airbag deployment, making it difficult for the emblem to follow the bending of the cover, possibly causing it to break with the subsequent risk for the vehicle occupant.

As described in patent document U.S. Pat. No. 5,775,721, this drawback can be solved for the case of one-part emblems using a snap-fitting plate provided with holes or other means facilitating its deformation during the opening of the airbag cover, absorbing part of the energy generated and preventing the emblem from breaking.

However, this solution is not applicable to emblems formed by two or more parts and the present invention is aimed at providing a solution for this case.

SUMMARY OF THE INVENTION

An object of the present invention is to allow the incorporation of emblems formed by two or more independent parts on the cover of an airbag module by simple fixing means without risks that parts of the emblem can be released, causing injuries to the vehicle occupant when the airbag cover breaks along the pre-established perforation lines so as to allow airbag deployment.

This and other objects are achieved by providing an airbag cover for automotive vehicles with means for predetermining its breaking during the deployment of the airbag cushion, which incorporates an emblem formed by at least two independent parts which is fixed to the cover by means of the aid of one or more rods arranged on its inner face with a snap-fitting plate arranged inside the cover and comprising at least two areas, each of which includes snap-fitting means cooperating with said rods and an intermediate area between them which is configured such that it can work as a bending area of the snap-fitting plate during the deployment of the airbag cushion, allowing relative movement between the parts of the emblem.

In a preferred embodiment, said intermediate area includes a part having less thickness than the rest, facilitating its deformation to be adapted to the movement of the cover during the deployment of the airbag cushion.

In another preferred embodiment, the snap-fitting means of the snap-fitting plate consist of elastic bodies with central holes cooperating with rods with enlarged end parts allowing their passage through said holes but preventing movement in the opposite direction.

In another preferred embodiment, the emblem has two parts each of which has a rod, and the snap-fitting part has two elastic bodies.

In another preferred embodiment, the emblem has two parts each of which has two rods, and the snap-fitting part has four elastic bodies arranged such that their central points occupy the corners of a hypothetical rectangle.

In another preferred embodiment, the emblem has two parts each of which has two rods, and the snap-fitting parts has four elastic bodies arranged such that their central points occupy the corners of a hypothetical rectangle.

In another preferred embodiment, the emblem has three parts each of which has a rod, and the snap-fitting part has three elastic bodies.

Other features and advantages of the present invention shall be understood from the following detailed description of an illustrative embodiment of its object in relation to the attached figures.

DETAILED DESCRIPTION OF THE INVENTION

Figure 1:
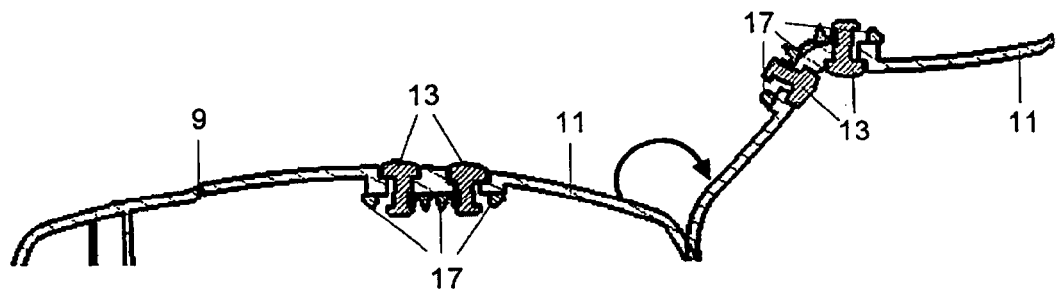
FIG. 1 shows a sectional view of the airbag cover at rest in the left part and during deployment of the airbag cushion in the right part.

FIG. 1 shows an airbag cover 11 according to the present invention incorporating an emblem 13 formed by two independent parts and fixed to the cover 11 by means of a snap-fitting plate 17.

The cover 11 includes a perforated line 9 by means of which it will break during deployment of the airbag. Once this occurs and as is shown in the right part of FIG. 1, the emblem 13 allows the part of the cover 11 separating during the exit of the airbag cushion to acquire a certain degree of bending, which is beneficial for preventing the release of parts of the cover that may injure the vehicle occupant.

Figure 5A:
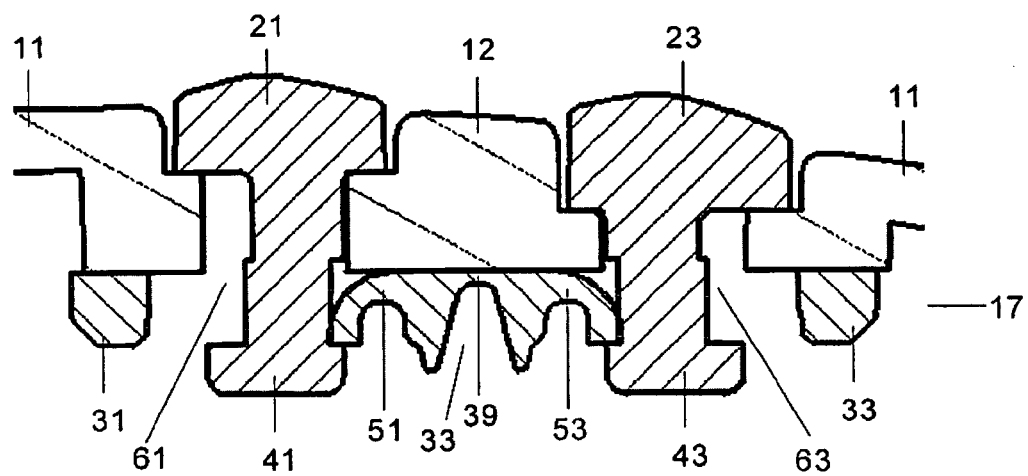
FIG. 5a shows a view according to the A-A section of FIGS. 2 and 4 of the emblem-snap-fitting plate assembly according to the first and second embodiments of the present invention at rest.
Figure 5B:
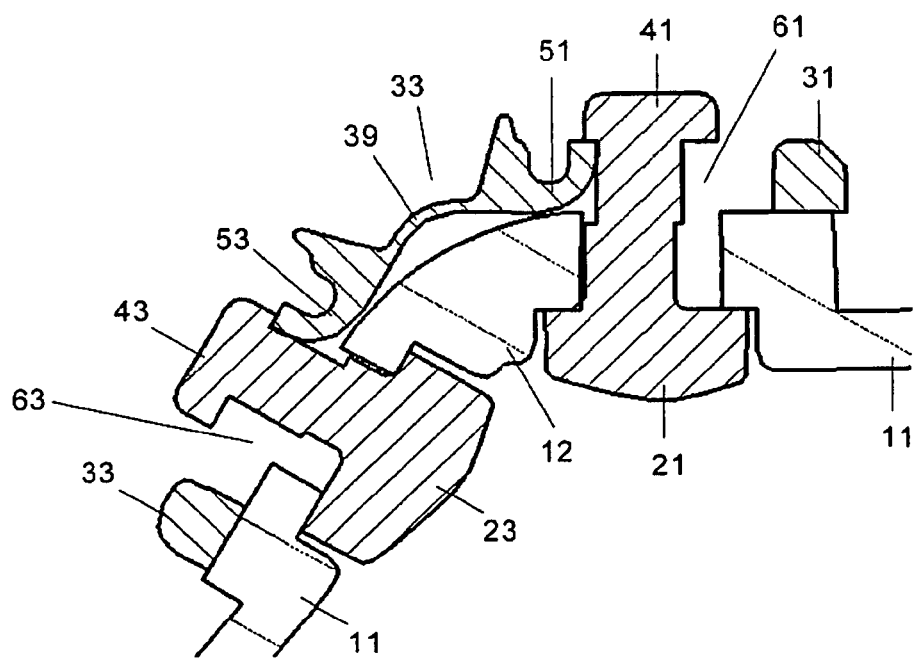
FIG. 5b shows a view according to the A-A section of FIGS. 2 and 4 of the emblem-snap-fitting plate assembly according to the first and second embodiments of the present invention during deployment of the airbag cushion.
Figure 2:
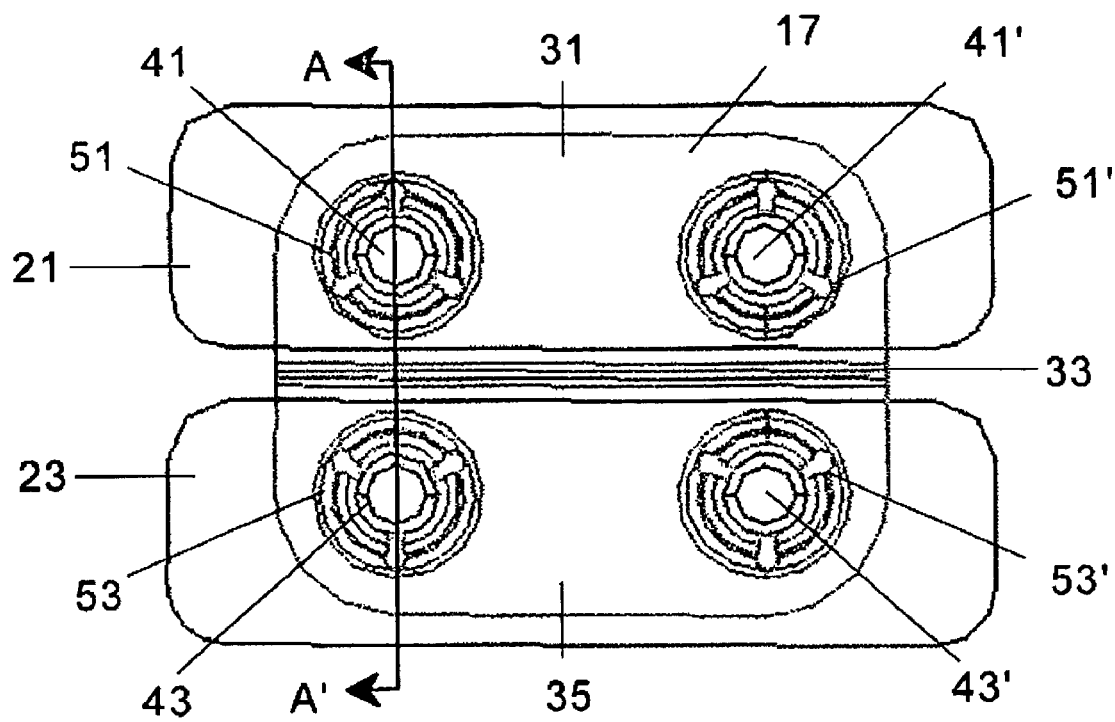
FIG. 2 shows a plan view from inside the airbag cover of the emblem-snap-fitting plate assembly according to a first embodiment of the present invention.
Figure 3:
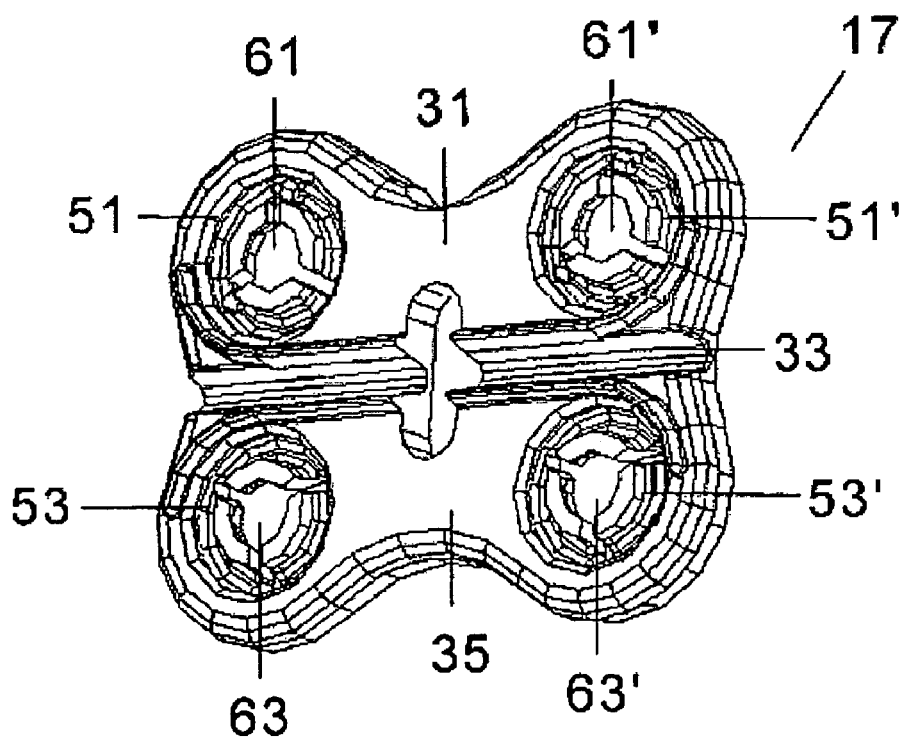
FIG. 3 shows a perspective view of a snap-fitting plate that can be used in the first embodiment of the present invention.

FIGS. 2 and 3 along with FIGS. 5a and 5b show a first embodiment of the invention in which the emblem 13 is formed by two independent parts 21, 23, schematically shown in FIG. 2, with rounded rectangular shaped heads and a snap-fitting plate 17 shown in FIG. 2 with a rectangular shape, and with a shape similar to that of a four-leaf clover in FIG. 3.

Part 21 includes rods 41, 41' for its fixing to the snap-fitting plate 17 by means of snap-fitting. Similarly, part 23 includes rods 43, 43' for its fixing by snap-fitting to the snap-fitting plate 17.

The snap-fitting plate 17 has two elastic bodies 51, 51' with central holes 61, 61' to receive the rods 41, 41' of part 21 and two elastic bodies 53, 53' with two central holes 63, 63' to receive the rods 43, 43' of part 23.

As can be seen in the Figures, the rods 41, 41', 43, 43' end with an enlarged body and the elastic bodies 51, 51', 53, 53' with the central holes 61, 61', 63, 63' of the plate 17 allow the passage through these holes of the enlarged bodies of the end parts of the rods 41, 41', 43, 43', but they prevent opposite movement. As a person skilled in the art will understand, the invention comprises these specific snap-fitting means and any other equivalent means.

The snap-fitting plate 17 is structured in a first area 31 in which the elastic bodies 51, 51' with the holes 61, 61' receiving the rods 41, 41' of the first part 21 of the emblem 13 are located, a second area 35 in which the elastic bodies 53, 53' with the holes 63, 63' receiving the rods 43, 43' of the second part 23 of the emblem 13 are located, and an intermediate area 33 between both, the central part 39 of which has less thickness than the rest.

According to FIGS. 5a and 5b, it can be seen that this configuration of the snap-fitting plate 17 allows the bending of the emblem 13, cover 11 and snap-fitting plate 17 assembly when the cover 11 breaks so as to allow the exit of the airbag cushion.

FIGS. 5a and 5b also show in greater detail that the cover 11 includes an offset area for the incorporation of the parts 21 and 23 on both sides of its central part 12 and the snap-fitting between the enlarged end body of the rods 41 and 43 and the elastic bodies 51, 53 which are arranged, respectively, around the holes 61 and 63 of the snap-fitting plate 17.

In the embodiment of the invention being described, the rods 41, 41', 43, 43' of the parts 21, 23 of the emblem 13 and the central points of the elastic bodies 51, 51', 53, 53' of the snap-fitting plate are arranged in the hypothetical corners of a rectangle, in the attempt that the dimensions are as small as possible, being compatible with the shape of the emblem 13.

Figure 4:
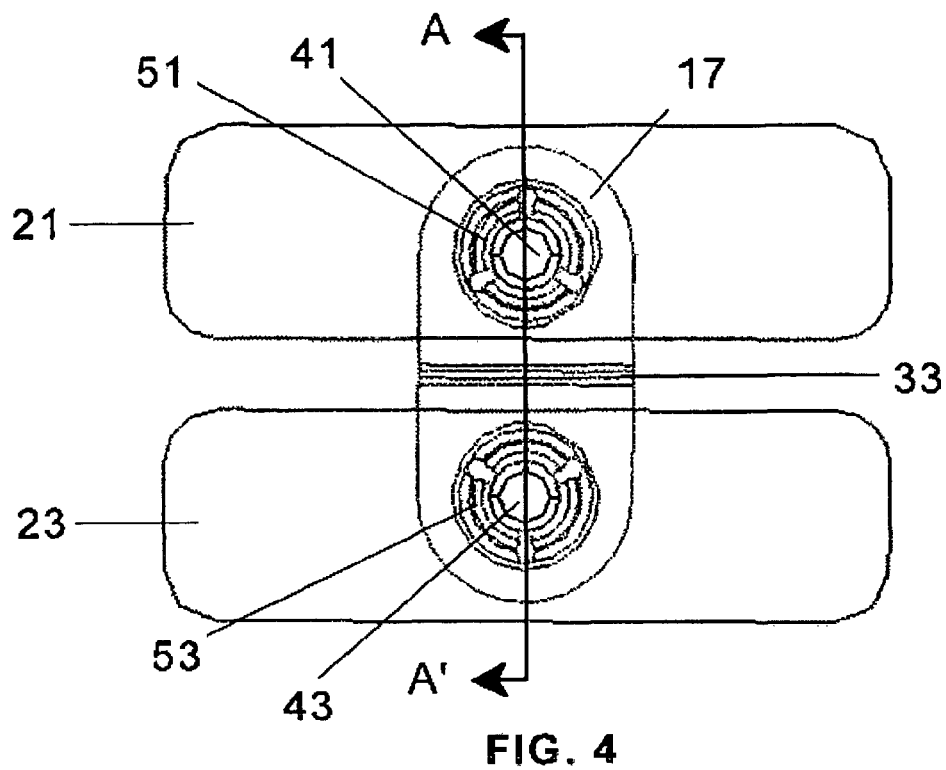
FIG. 4 shows a plan view from inside the airbag cover of the emblem-snap-fitting plate assembly according to a second embodiment of the present invention.

FIG. 4 shows a second embodiment of the invention similar to the first embodiment, except that in the two parts 21, 23 of the emblem only one rod 41, 43 instead of two rods is incorporated and instead of having two elastic bodies in each area 31, 35 the snap-fitting plate only has one elastic body 51, 53 to receive said rods 41, 43.

Figure 6:
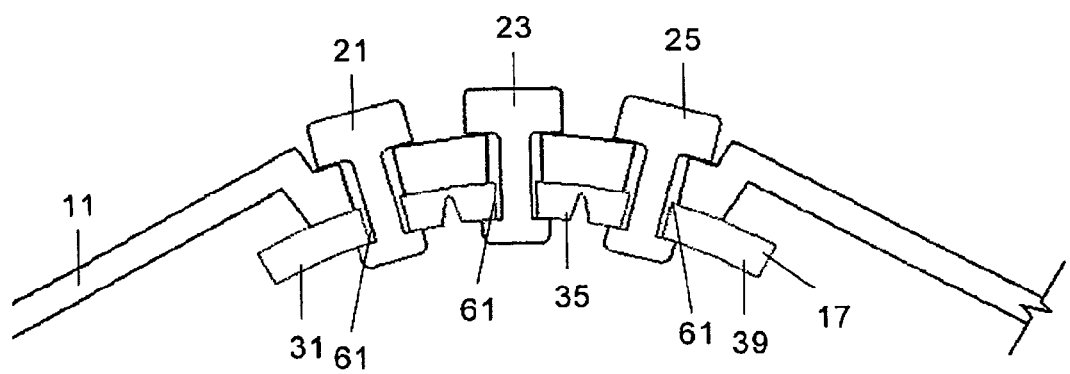
FIG. 6 shows a cross-sectional view of the emblem-snap-fitting plate assembly according to a third embodiment of the present invention.
Figure 7:
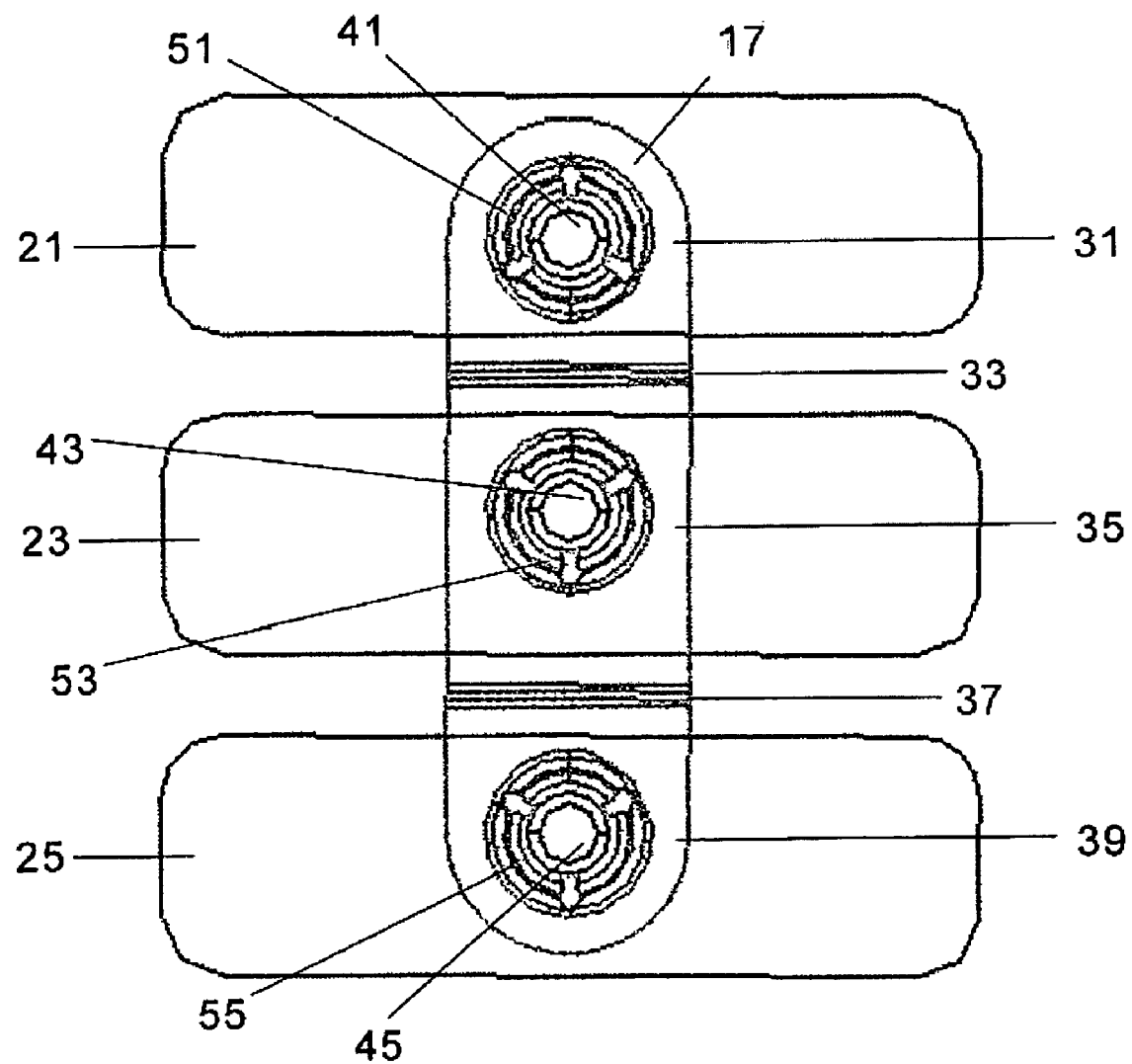
FIG. 7 shows a plan view from inside the airbag cover of the emblem-snap-fitting plate assembly according to the third embodiment of the present invention.

FIGS. 6 and 7 show a third embodiment of the invention in which the emblem is formed by three independent parts 21, 23, 25, each of them including a rod 41, 43, 45 and a snap-fitting plate 17 which is structured in a first area 31 in which an elastic body 51 with a hole 61 for receiving the rod 41 is located, a second area 35 in which an elastic body 53 with a hole 63 for receiving the rod 43 is located and a third area in which an elastic body 55 with a hole 65 for receiving the rod 45 is located. Areas 31, 35, 39 are separated by intermediate areas 33, 37 with a central part having less thickness working, like in the other embodiments of the invention, as a bending area of the snap-fitting plate 17 during deployment of the airbag cushion, allowing relative movement between the three parts 21, 23, 25 of the emblem.

Any modifications comprised within the scope defined by the following claims can be introduced in the embodiments described above.

The invention claimed is:

1. An airbag cover (11) for automotive vehicles comprising means to predetermine its breaking during deployment of an airbag cushion, incorporating an emblem (13) fixed to the cover (11) by means of one or more rods and a snap-fitting plate (17) arranged inside the cover (11), wherein:
   a) the emblem (13) is formed by at least two independent parts (21, 23);
   b) the snap-fitting plate (17) comprises at least two areas (31, 35), each of which includes snap-fitting means cooperating with the rods of each of said at least two parts (21, 23) and an intermediate area (33) between them which is configured such that it can work as a bending area of the snap-fitting plate (17) during deployment of the airbag cushion, allowing relative movement between the parts (21, 23) of the emblem (13).

2. An airbag cover (11) for automotive vehicles according to claim 1, wherein said intermediate area (33) includes a part (39) having less thickness than the rest.

3. An airbag cover (11) for automotive vehicles according to claim 1, wherein said snap-fitting means cooperating with said rods consist of elastic bodies with central holes.

4. An airbag cover (11) for automotive vehicles according to claim 3, wherein the emblem (13) is formed by two independent parts (21, 23) each of them including a rod (41, 43) and in that the snap-fitting plate (17) includes two elastic bodies (51; 53) with central holes (61; 63).

5. An airbag cover (11) for automotive vehicles according to claim 3, wherein the emblem (13) is formed by two independent parts (21, 23), each of them including two rods (41, 41'; 43, 43'), and in that the snap-fitting plate (17) includes four elastic bodies (51, 51'; 53, 53') with central holes (61, 61'; 63, 63').

6. An airbag cover (11) for automotive vehicles according to claim 5, wherein said rods (41, 41'; 43, 43') are arranged on the cover (11) in hypothetical corners of a rectangle.

7. An airbag cover (11) for automotive vehicles according to claim 5, wherein the snap-fitting plate (17) has a four-leaf clover shape, with said elastic bodies (51, 51'; 53, 53') arranged in each of said leaves.

8. An airbag cover (11) for automotive vehicles according to claim 1, wherein the emblem (13) is formed by three independent parts (21, 23, 25), each of them including a rod (41, 43, 45), and in that the snap-fitting plate (17) comprises three areas (31, 35, 39) with an elastic body (51, 53, 55) in each of them and two intermediate areas (33, 37) between them.

9. An airbag cover (11) for automotive vehicles according to claim 2, wherein said snap-fitting means cooperating with said rods consist of elastic bodies with central holes.

10. An airbag cover (11) for automotive vehicles according to claim 9, wherein the emblem (13) is formed by two independent parts (21, 23) each of them including a rod (41, 43) and in that the snap-fitting plate (17) includes two elastic bodies (51; 53) with central holes (61; 63).

11. An airbag cover (11) for automotive vehicles according to claim 9, wherein the emblem (13) is formed by two independent parts (21, 23), each of them including two rods (41, 41'; 43, 43'), and in that the snap-fitting plate (17) includes four elastic bodies (51, 51'; 53, 53') with central holes (61, 61'; 63, 63').

12. An airbag cover (11) for automotive vehicles according to claim 11, wherein said rods (41, 41'; 43, 43') are arranged on the cover (11) in hypothetical corners of a rectangle.

13. An airbag cover (11) for automotive vehicles according to claim 11, wherein the snap-fitting plate (17) has a four-leaf clover shape, with said elastic bodies (51, 51'; 53, 53') arranged in each of said leaves.

14. An airbag cover (11) for automotive vehicles according to claim 2, wherein the emblem (13) is formed by three independent parts (21, 23, 25), each of them including a rod (41, 43, 45), and in that the snap-fitting plate (17) comprises three areas (31, 35, 39) with an elastic body (51, 53, 55) in each of them and two intermediate areas (33, 37) between them.

15. An airbag cover (11) for automotive vehicles according to claim 3, wherein the emblem (13) is formed by three independent parts (21, 23, 25), each of them including a rod (41, 43, 45), and in that the snap-fitting plate (17) comprises three areas (31, 35, 39) with an elastic body (51, 53, 55) in each of them and two intermediate areas (33, 37) between them.

16. An airbag cover (11) for automotive vehicles according to claim 9, wherein the emblem (13) is formed by three independent parts (21, 23, 25), each of them including a rod (41, 43, 45), and in that the snap-fitting plate (17) comprises three areas (31, 35, 39) with an elastic body (51, 53, 55) in each of them and two intermediate areas (33, 37) between them.

\* \* \* \* \*